United States Patent
Li et al.

(10) Patent No.: US 8,190,668 B2
(45) Date of Patent: May 29, 2012

(54) INVERSE HADAMARD TRANSFORM CONVERTER AND SYSTEM

(75) Inventors: Jincheng Li, Shanghai (CN); Stefan Eckart, Munich (DE)

(73) Assignee: NVIDIA Corporation, Santa Clara, CA (US)

( * ) Notice: Subject to any disclaimer, the term of this patent is extended or adjusted under 35 U.S.C. 154(b) by 1005 days.

(21) Appl. No.: 12/147,261

(22) Filed: Jun. 26, 2008

(65) Prior Publication Data

US 2009/0172061 A1    Jul. 2, 2009

(30) Foreign Application Priority Data

Dec. 29, 2007    (CN) .......................... 2007 1 0308374

(51) Int. Cl.
*G06F 17/14*    (2006.01)

(52) U.S. Cl. ....................................................... 708/400
(58) Field of Classification Search .................. 708/400
See application file for complete search history.

(56) References Cited

U.S. PATENT DOCUMENTS

| 6,625,628 | B1 * | 9/2003 | Matsuura | 708/300 |
| 6,650,792 | B1 * | 11/2003 | Aida et al. | 382/298 |
| 7,200,629 | B2 * | 4/2007 | Medlock | 708/201 |

* cited by examiner

*Primary Examiner* — Tan Mai
(74) *Attorney, Agent, or Firm* — Patterson & Sheridan, LLP

(57) ABSTRACT

An Inverse Hadamard Transform (IHT) converter and system includes a first group of registers for receiving coefficients inputted to the IHT converter; a first adder for adding selected the coefficients stored in the first group of registers; a second group of registers for receiving results from the first adder; and a second adder for adding selected the results stored in the second group of registers.

25 Claims, 8 Drawing Sheets

| | cycles | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| R0 | p0 | p2 | p1 | p3 | p4 | p6 | p5 | p7 | p8 | p10 | p9 | p11 | p12 |
| R1 | | p0 | p2 | p1 | p3 | p4 | p6 | p5 | p7 | p8 | p10 | p9 | p11 |
| R2 | | | p0 | p2 | p1 | p3 | p4 | p6 | p5 | p7 | p8 | p10 | p9 |
| Add0 | | p0+p2 | p0-p2 | p1+p3 | p1-p3 | p4+p6 | p4-p6 | p5+p7 | p5-p7 | p8+p10 | p8-p10 | p9+p11 | p9-p11 |
| R3 | | | y0 | y0 | y0 | y0 | y4 | y4 | y4 | y4 | y8 | y8 | y8 |
| R4 | | | | y1 | y1 | y1 | y1 | y1 | y7 | y7 | y7 | y9 | y9 |
| R5 | | | | | y3 | y3 | y3 | y5 | y5 | y5 | y5 | y5 | y11 |
| R6 | | | | | | y2 | y2 | y2 | y2 | y6 | y6 | y6 | y6 |
| Add1 | | | | | y0+y3 | y0-y3 | y1+y2 | y1-y2 | y4+y7 | y4-y7 | y5+y6 | y5-y6 | y8+y11 |
| R7 | | | | | | z0 | z3 | z1 | z2 | z4 | z7 | z5 | z6 |

| | cycles | | | | | | | | |
|---|---|---|---|---|---|---|---|---|---|
| | 14 | 15 | 16 | 17 | 18 | 19 | 20 | 21 | |
| R0 | p14 | p13 | p15 | | | | | | |
| R1 | p12 | p14 | p13 | p15 | | | | | |
| R2 | p11 | p12 | p14 | p13 | p15 | | | | |
| Add0 | p12+p14 | p12-p14 | p13+p15 | p13-p15 | | | | | |
| R3 | y8 | y12 | y12 | y12 | y12 | | | | |
| R4 | y9 | y9 | y9 | y15 | y15 | y15 | | | |
| R5 | y11 | y13 | y13 | y13 | y13 | y13 | y13 | | |
| R6 | y10 | y10 | y10 | y10 | y14 | y14 | y14 | y14 | |
| Add1 | y8-y11 | y9+y10 | y9-y10 | y12+y15 | y12-y15 | y13+y14 | y13-y14 | | |
| R7 | z8 | z11 | z9 | z10 | z12 | z15 | z13 | z14 | |

FIG. 3

| addr | | before pass 1 | pass 1 | after pass 1 | pass 2 | after pass 2 |
|---|---|---|---|---|---|---|
| | | | Intra 16x16 DC | | | |
| lower half | 0 | p0 | | p0 | | u0 |
| | 1 | p2 | | p2 | | u1 |
| | 2 | p1 | | p1 | | u4 |
| | 3 | p3 | | p3 | | u5 |
| | 4 | p4 | | p4 | | u2 |
| | 5 | p6 | | p6 | | u3 |
| | 6 | p5 | | p5 | | u6 |
| | 7 | p7 | | p7 | | u7 |
| | 8 | p8 | | p8 | | u8 |
| | 9 | p10 | | p10 | | u9 |
| | 10 | p9 | pass 1 output in serial: | p9 | pass 2 output in serial: | u12 |
| | 11 | p11 | | p11 | | u13 |
| | 12 | p12 | | p12 | | u10 |
| | 13 | p14 | z0 z3 z1 z2 | p14 | u0 u12 u4 u8 | u11 |
| | 14 | p13 | z4 z7 z5 z6 | p13 | u1 u13 u5 u9 | u14 |
| | 15 | p15 | z8 z11 z9 z10 | p15 | u2 u14 u6 u10 | u15 |
| higher half | 16 | x | z12 z15 z13 z14 | z0 | u3 u15 u7 u11 | z0 |
| | 17 | x | | z8 | | z8 |
| | 18 | x | addr remapping 1 required | z4 | addr remapping2 required | z4 |
| | 19 | x | ========> | z12 | ========> | z12 |
| | 20 | x | | z1 | | z1 |
| | 21 | x | | z9 | | z9 |
| | 22 | x | | z5 | | z5 |
| | 23 | x | | z13 | | z13 |
| | 24 | x | | z2 | | z2 |
| | 25 | x | | z10 | | z10 |
| | 26 | x | | z6 | | z6 |
| | 27 | x | | z14 | | z14 |
| | 28 | x | | z3 | | z3 |
| | 29 | x | | z11 | | z11 |
| | 30 | x | | z7 | | z7 |
| | 31 | x | | z15 | | z15 |

FIG. 8

| addr | | before pass 1 | pass 1 | after pass 1 | pass 2 | after pass 2 |
|---|---|---|---|---|---|---|
| | | | Chroma DC | | | |
| lower half | 0 | p0 | | p0 | | u0 |
| | 1 | p1 | | p1 | | u1 |
| | 2 | x | | x | | u4 |
| | 3 | x | | x | | u5 |
| | 4 | p4 | | p4 | | u2 |
| | 5 | p5 | | p5 | | u3 |
| | 6 | x | | x | | u6 |
| | 7 | x | | x | | u7 |
| | 8 | p2 | | p2 | | x |
| | 9 | p3 | | p3 | | x |
| | 10 | x | pass 1 output in serial: | x | pass 2 output in serial: | x |
| | 11 | x | | x | | x |
| | 12 | p6 | z0 x x z1 | p6 | u0 x x u4 | x |
| | 13 | p7 | z4 x x z5 | p7 | u1 x x u5 | x |
| | 14 | | z2 x x z3 | x | u2 x x u6 | x |
| | 15 | | z6 x x z7 | x | u3 x x u7 | x |
| higher half | 16 | x | | z0 | | z0 |
| | 17 | x | | z4 | | z4 |
| | 18 | x | addr remapping 1 required =======> | x | addr remapping2 required =======> | x |
| | 19 | x | | x | | x |
| | 20 | x | | z1 | | z1 |
| | 21 | x | | z5 | | z5 |
| | 22 | x | | x | | x |
| | 23 | x | | x | | x |
| | 24 | x | | z2 | | z2 |
| | 25 | x | | z6 | | z6 |
| | 26 | x | | x | | x |
| | 27 | x | | x | | x |
| | 28 | x | | z3 | | z3 |
| | 29 | x | | z7 | | z7 |
| | 30 | x | | x | | x |
| | 31 | x | | x | | x |

FIG. 10

INVERSE HADAMARD TRANSFORM CONVERTER AND SYSTEM

CROSS-REFERENCE TO RELATED APPLICATIONS

This application claims benefit of Chinese patent application number 200710308374.X, filed Dec. 29, 2007, which is herein incorporated by reference.

FIELD OF THE INVENTION

The present invention relates to an encoding/decoding technique for image data, and more particularly to an inverse Hadamard Transform converter and system used in, for example, AVC/H.264 decoders.

BACKGROUND

An image usually contains a very large amount of information. To save the storage space and bandwidth for transmission, a highly efficient coding is employed for encoding image data when the image is stored or transmitted. For example, the image data is subjected to a Discrete Cosine Transformation (DCT) into DCT coefficients for each block in many compression techniques.

A Hadamard transform is a process associated with this DCT transformation or a process for transforming the image data. The Hadamard transform is an orthogonal transformation with a transformation matrix composed of the elements of "1" or "−1," which is the simplest one that is represented only by addition and subtraction.

A Hadamard matrix HJ is a symmetric J×J matrix with elements +1 and −1. The Hadamard matrix of second order is given by:

$$H_2 = \begin{vmatrix} 1 & 1 \\ 1 & -1 \end{vmatrix}.$$

Also, the Hadamard matrix of fourth order is given by:

$$H_4 = \begin{vmatrix} 1 & 1 & 1 & 1 \\ 1 & -1 & 1 & -1 \\ 1 & 1 & -1 & -1 \\ 1 & -1 & -1 & 1 \end{vmatrix}.$$

The above Hadamard matrix is called a natural type, in which the base vectors are not arranged in sequence. Thus, if the permutation of the base vectors is repeated in order to shift the base vector in the second row to the fourth row, a Walsh type Hadamard matrix is obtained as follows wherein the base vectors are arranged in a sequence.

$$H_4 = \begin{vmatrix} 1 & 1 & 1 & 1 \\ 1 & 1 & -1 & -1 \\ 1 & -1 & -1 & 1 \\ 1 & -1 & 1 & -1 \end{vmatrix}$$

Hadamard matrices having an order other than powers of 2 do exist, but they are not widely used in image processing.

An inverse Hadamard matrix is easily computed as:

$$H_J^{-1} = \frac{1}{J} H_J$$

Accordingly, the Hadamard transform is given by: $F = H_M f H'_N$; and its inverse is also given by:

$$f = \frac{1}{MN} H_M F H'_N.$$

In practice, the encoding side usually has more resources available which can be used to process the image data, e.g., performing a Hadamard Transform. However, for the decoding side, especially some low-end applications such as a movable video player, a mobile phone, etc., useable resources are very limited, and thus how the Inverse Hadamard Transform can be performed becomes an important problem.

If in the decoding side, the Inverse Hadamard Transform (IHT) is performed by software, the processor load and usage of the memory of the decoding device will increase and the performance will be degraded greatly. Currently, there are some hardware apparatuses implemented as the IHT converters, for example, for the standard of Advanced Video Coding (AVC) standard also known as H.264. However, the IHT conversions are realized in a chip by having a lot of adders and registers, which will lead to the area of the chip being enlarged, and thus, the cost increases.

Therefore, what is needed is an IHT device that can achieve a good balance between the cost and the performance.

SUMMARY OF THE INVENTION

To solve the above problems, an embodiment of the present invention provides an Inverse Hadamard Transform converter which comprises a first group of registers for receiving coefficients inputted to the IHT converter; a first adder for adding selected coefficients stored in the first group of registers; a second group of registers for receiving results from the first adder; and a second adder for adding selected results stored in the second group of registers.

Another embodiment of the present invention provides an Inverse Hadamard Transform converter which comprises a first group of registers; a first adder; a first multiplexer for inputting selected values stored in the first group of registers to the first adder; a second group of registers coupled to the first adder; a second adder; and a second multiplexer for inputting selected values stored in the second group of registers into the second adder.

Another embodiment of the present invention provides an Inverse Hadamard Transform converter system which comprises a SRAM; and an IHT converter comprising a first group of registers for receiving coefficients inputted to the IHT converter; a first adder for adding selected coefficients stored in the first group of registers; a second group of registers for receiving results from the first adder; and a second adder for adding selected results stored in the second group of registers; wherein an input of the IHT converter is coupled to the SRAM via a read channel; and an output of the IHT converter is coupled to the SRAM via a write channel.

BRIEF DESCRIPTION OF THE DRAWINGS

Embodiments of the present invention are illustrated by way of example, and not by way of limitation, in the figures of the accompanying drawings, in which like reference numerals refer to similar elements and in which:

FIG. 3 illustrates a working pipeline of the IHT converter of FIG. 2;

FIG. 8 illustrates the storage states of the SRAM of the IHT conversion system according to one embodiment of the present invention;

FIG. 10 illustrates the storage states of the SRAM of the IHT conversion system according to one embodiment of the present invention;

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, of a computer executed-step, logic block, process, etc., is discussed here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figures 1, 2:
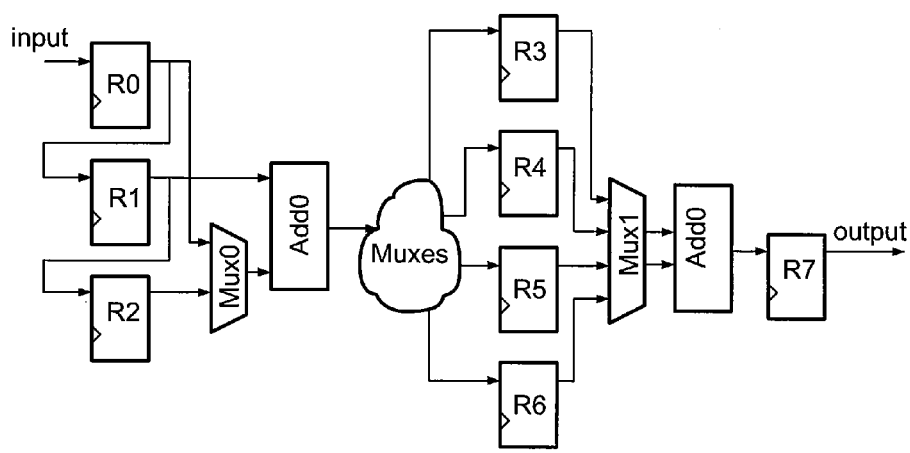
FIG. 1 illustrates an example of an inverse Hadamard Transform.
FIG. 2 illustrates an IHT converter according to one embodiment of the present invention.

FIG. 1 illustrates an example of an inverse Hadamard Transform. Provided that $p15, p14, \ldots, p0$ are the coefficients to be computed for an IHT converter, $z15, z14, \ldots, z0$ are the output results from the IHT converter.

In FIG. 1 it should be noted that a 4×4 coefficient matrix P is provided to be decoded because in AVC/H.264, the Hadamard Transform is required for compression of Intra__16×16 DC (4×4 for Y) and Chroma DC (2×2 for both Cr and Cb) coefficients.

H.264 is a new advanced video compression coding scheme that is becoming the worldwide digital video standard for consumer electronics and personal computers. The macro block pair structure in H.264 allows 16×16 block size in field mode, which means that H.264 has much better performance than the previous image encoding/decoding standards. H.264 has a great improvement in compression performance, and the code rate can be reduced to half or even less for the same image quality.

The Inverse Hadamard Transform is essential for AVC/H.264 decoders. However, the application of the present invention is not limited to AVC/H.264. It should be known to persons having ordinary skills in the art that the present invention may be used for any other standards involving a Hadamard Transform.

An Inverse Hadamard Transform may be broken down as follows:

$$U = H * P * H' = H * (H * P'),$$

$$U = \begin{bmatrix} 1 & 1 & 1 & 1 \\ 1 & 1 & -1 & -1 \\ 1 & -1 & -1 & 1 \\ 1 & -1 & 1 & -1 \end{bmatrix} * \begin{bmatrix} p0 p1 p2 p3 \\ p4 p5 p6 p7 \\ p8 p9 p10 p11 \\ p12 p13 p14 p15 \end{bmatrix} * \begin{bmatrix} 1 & 1 & 1 & 1 \\ 1 & 1 & -1 & -1 \\ 1 & -1 & -1 & 1 \\ 1 & -1 & 1 & -1 \end{bmatrix} =$$

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix} * \left( \begin{bmatrix} 1 & 1 & 1 & 1 \\ 1 & 1 & -1 & -1 \\ 1 & -1 & -1 & 1 \\ 1 & -1 & 1 & -1 \end{bmatrix} * \begin{bmatrix} p0 p4 p8 p12 \\ p1 p5 p9 p13 \\ p2 p6 p10 p14 \\ p3 p7 p11 p15 \end{bmatrix} \right) = \begin{bmatrix} 1 & 1 & 1 & 1 \\ 1 & 1 & -1 & -1 \\ 1 & -1 & -1 & 1 \\ 1 & -1 & 1 & -1 \end{bmatrix} *$$

-continued $$\begin{bmatrix} (p0+p2)+(p1+p3) & (p4+p6)+(p5+p7) & (p8+p10)+(p9+p11) & (p12+p14)+(p13+p15) \\ (p0-p2)+(p1-p3) & (p4-p6)+(p5-p7) & (p8-p10)+(p9-p11) & (p12-p14)+(p13-p15) \\ (p0-p2)-(p1-p3) & (p4-p6)-(p5-p7) & (p8-p10)-(p9-p11) & (p12-p14)-(p13-p15) \\ (p0+p2)-(p1+p3) & (p4+p6)-(p5+p7) & (p8+p10)-(p9+p11) & (p12+p14)-(p13+p15) \end{bmatrix}$$

Provided that y15, y14, ..., y0 are intermediate variables for realizing the Inverse Hadamard Transform, it is proved that the Inverse Hadamard Transform can be broken down to the following equations:

| | |
|---|---|
| y0 = p0 + p2 | y8 = p8 + p10 |
| y1 = p0 − p2 | y9 = p8 − p10 |
| y2 = p1 − p3 | y10 = p9 + p11 |
| y3 = p1 + p3 | y11 = p9 − p11 |
| y4 = p4 + p6 | y12 = p12 + p14 |
| y5 = p4 − p6 | y13 = p12 − p14 |
| y6 = p5 − p7 | y14 = p13 + p15 |
| y7 = p5 + p7 | y15 = p13 + p15 |
| z0 = y0 + y3 | z8 = y8 + y11 |
| z1 = y1 + y2 | z9 = y9 + y10 |
| z2 = y1 − y2 | z10 = y9 − y10 |
| z3 = y0 − y3 | z11 = y8 − y11 |
| z4 = y4 + y7 | z12 = y12 + y15 |
| z5 = y5 + y6 | z13 = y13 + y14 |
| z6 = y5 − y6 | z14 = y13 − y14 |
| z7 = y4 − y7 | z15 = y12 − y15 |

As shown in FIG. 1, coefficients matrix P is converted into matrix Y for intermediate variables and then the matrix Y for intermediate variables is converted into matrix Z for results of the Inverse Hadamard Transform.

FIG. 2 illustrates an IHT converter according to one embodiment of the present invention for implementing the above algorithms. As shown in FIG. 2, only two adders and eight registers are included in the converter.

The IHT converter of this embodiment has a group of registers R0, R1 and R2 for receiving the coefficients inputted into the IHT converter. The input of register R0 is used to receive the inputted coefficients, and the output of register R0 is coupled to register R1 and a multiplexer Mux0. The output of register R1 is coupled to register R2 and an adder Add0. The output of register R2 is coupled to the multiplexer Mux0. Also, the output of multiplexer Mux0 is coupled to the adder Add0.

The IHT converter of this embodiment also has another group of registers R3, R4, R5 and R6. The output of adder Add0 is coupled to the inputs of registers R3, R4, R5 and R6 through a selection circuit Muxes. The outputs of registers R3, R4, R5 and R6 are coupled to a multiplexer Mux1. The multiplexer Mux1 has two outputs and both of them are coupled to inputs of an adder Add1. The result of adder Add1 is outputted to a register R7.

FIG. 3 illustrates a working pipeline of the IHT converter of FIG. 2. The working process of the IHT converter as shown in FIG. 2 is described in detail according to the working pipeline described in FIG. 3.

Coefficients p0, p2, p1, p3, p4, p6, p5, p7 . . . are inputted into register R0 sequentially, one pre cycle as shown in the first line of FIG. 3. The output of R0 is fed into register R1 after one cycle and the output of register R1 is fed into register R2 subsequently. Thus, each output of registers R1 and R2 is the same as that of register R0 but one and two cycles later respectively as shown in FIG. 3.

Outputs of registers R0 and R2 are fed into the multiplexer Mux0 which outputs the outputs of register R0 or R2 selectively, for example, depending on the cycles. After the outputs of register R1 and multiplexer Mux0 are added by the adder Add0, intermediate variables y0, y1, y3, y2, y4, y5, y7, y6 . . . are generated.

The intermediate variables y0, y1, y3, y2, y4, y5, y7, y6 . . . are selectively transmitted after cycling into registers R3, R4, R5 and R6 through a selection circuit Muxes. The values of the intermediate variables stored in the registers R3, R4, R5 and R6 are listed as shown in FIG. 3. The multiplexer Mux1 picks up the corresponding intermediate variables from registers R3, R4, R5 and R6 in accordance with the above IHT algorithms and they are fed into the adder Add1. After computation of the adder Add1, the final IHT coefficients z0, z3, z1, z2, z4, z7, z5, z6 . . . are generated. In the register R7, output coefficients z0, z3, z1, z2, z4, z7, z5, z6 . . . are stored after cycling.

The working process when coefficients p8-p15 are inputted in order to obtain the output z8-z15 is just the same as the above according to the dark grey portion of FIG. 3 and thus is not duplicated here. However, it should be noted from FIG. 3 that input coefficients are fed into the converter circuit sequentially, and five cycles later the first output coefficient is available in series. Accordingly, the circuit can work continuously to output valid data without idle cycles as long as valid coefficients are fed thereinto.

The IHT converter of FIG. 2 uses only eight registers and two adders. The area cost is much smaller in comparison with the traditional converters in the prior art. The cost and power usage of the IHT converter according to the present invention are both reduced.

Figure 4:
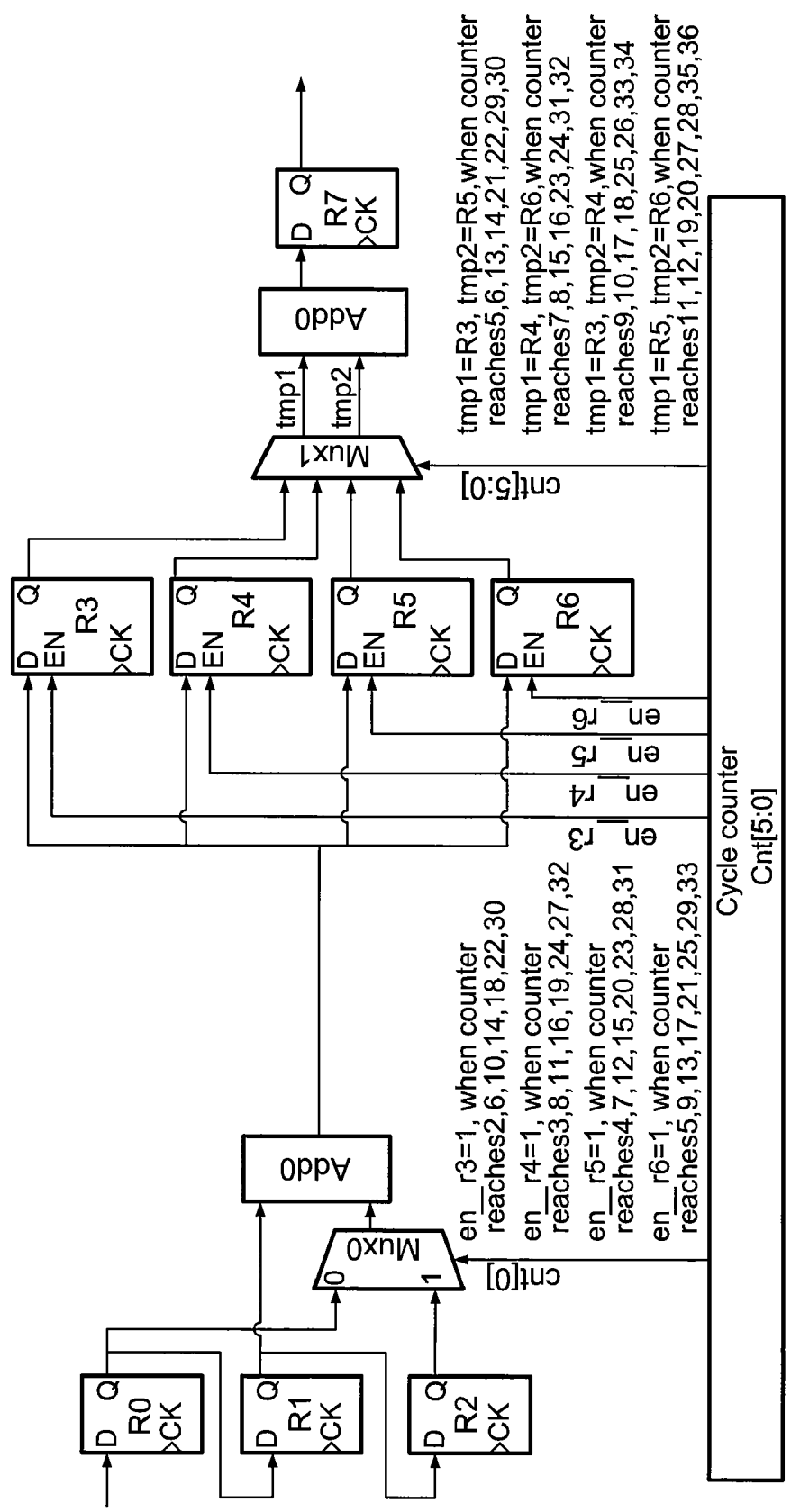
FIG. 4 illustrates an IHT converter according to another embodiment of the present invention.

FIG. 4 illustrates an IHT converter according to another embodiment of the present invention. The descriptions of the portions which are the same as those of the previous embodiment are omitted.

As shown in FIG. 4, the output of adder Add0 of the IHT converter of this embodiment is coupled to the registers R3, R4, R5 and R6 directly. Also, the IHT converter of this embodiment comprises a cycle counter. The cycle counter provides a selection signal Cnt[0] to the multiplexer Mux0, wherein Cnt[0] represents the value of the last bit of the cycle counter.

The cycle counter also provides four enable signals en_r3, en_r4, en_r5, and en_r6 to the registers R3, R4, R5 and R6 respectively. Each of the registers R3, R4, R5 and R6 is only allowed to be written into an enable signal corresponding to the register is also received at that time. In this way, the cycle counter, instead of the selection circuit Muxes in the embodiment as shown in FIG. 2, controls the results of the adder Add0 to be written into the correct register. Specifically, the enable signal is of value 1 as shown in FIG. 3. When the counter reaches 2, 6, 10, 14, 18, 22, 26, 30. . . the enable signal en_r3=1 and the result of the adder Add0 is written into the register R3; when the counter reaches 3, 8, 11, 16, 19, 24, 27, 32. . . the enable signal en_r4=1 and the result of the adder Add0 is written into the register R4; when the counter reaches 4, 7, 12, 15, 20, 23, 28, 31. . . the enable signal en_r5=1 and the result of the adder Add0 is written into the register R5; and when the counter reaches 5, 9, 13, 17, 21, 25, 29, 33 . . . the enable signal en_r6=1 and the result of the adder Add0 is written into the register R6.

The cycle counter further provides a selection signal Cnt [5:0] to the multiplexer Mux1, wherein Cnt [5:0] represents the value of the last 6 bits of the cycle counter. The multiplexer Mux1 is ordered by the selection signal to pick up the values of the correct registers and feeds them to the adder Add1. Specifically, when the counter reaches 5, 6, 13, 14, 21, 22, 29, 30. . . tmp1=R3, tmp2=R5; when the counter reaches 7, 8,15, 16, 23, 24, 31, 32. . . tmp1=R4, tmp2=R6; when the counter reaches 9, 10, 17, 18, 25, 26, 33, 34. . . tmp1=R3, tmp2=R4; when the counter reaches 9, 10, 17, 18, 25, 26, 33, 34. . . tmp1=R3, tmp2=R4; and when the counter reaches 11, 12, 19, 20, 27, 28, 35, 36. . . tmp1=R5, tmp2=R6, wherein tmp1 and tmp2 represent the inputs of the adder Add1.

It can be seen from the IHT converter of this embodiment that the selections of the multiplexers Mux0 and Mux1 as well as the registers R3, R4, R5 and R6 are realized by control signals provided by a cycle counter. Since the area of the chip and power usage is hardly affected by increasing a counter, the area (cost) of the IHT converter of this embodiment is minimized.

Figures 5A, 5B:
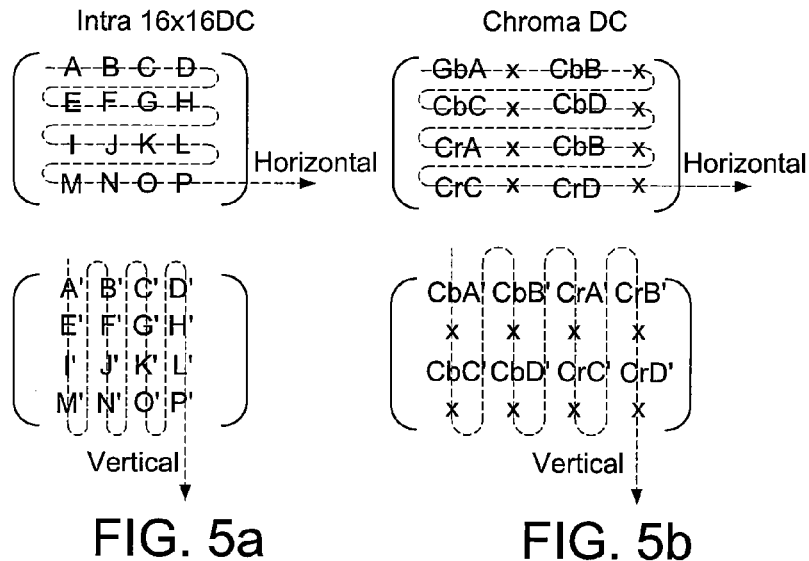
FIGS. 5a and 5b illustrate the inverse Hadamard Transform under the standard of AVC/H.264.

FIGS. 5a and 5b illustrate the inverse Hadamard Transform under the standard of AVC/H.264 wherein A-P in FIG. 5a are Intra 16×16 DC coefficients; CbA-CbD in FIG. 5b are Cb Chroma DC coefficients and CrA-CrD in FIG. 5b are Cr Chroma DC coefficients. In particular, x in FIG. 5b is a padding invalid variable through which the processing of Chroma DC coefficients fits in the same implementation by padding invalid coefficients at appropriate places.

Under the standard of AVC/H.264, as shown in FIG. 5, there are two passes: passes 1 and 2, wherein pass 1 is a horizontal feeding, and pass 2 is vertical feeding. That is to say, in pass 1, the coefficients A, B . . . P are inputted into the IHT converter horizontally, and corresponding output of A', B' . . . P' are produced; and in pass 2, coefficients A', B' . . . P' are inputted into the IHT converter again vertically and then the final results are produced.

Referring to FIGS. 2 and 3, the IHT converter processes 16 coefficients in one pass. However, to finish Inverse Hadamard Transform for the 16 coefficients of Intra_16×16 DC, the coefficients need to go through the IHT converter twice. To ensure the computing speed of the converter, a continuous valid coefficient feeding is required. In this way, the outputted results are continuous without an idle cycle.

Figure 6:
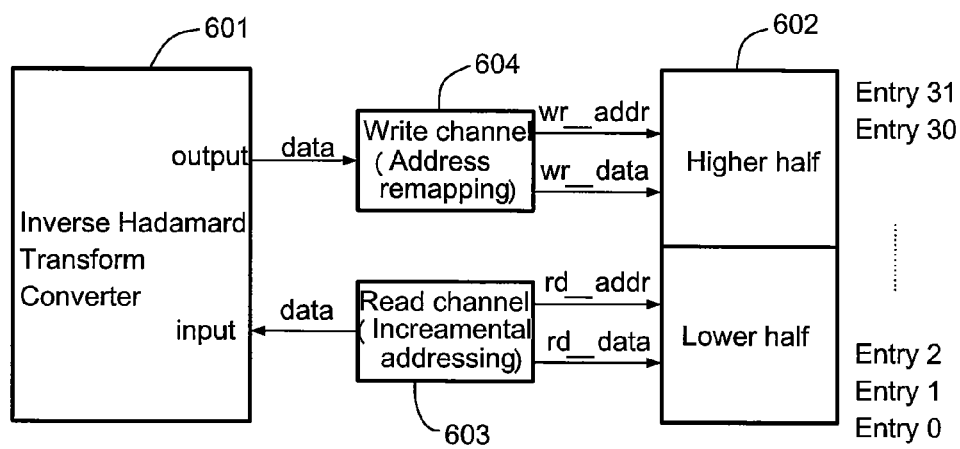
FIG. 6 illustrates an Inverse Hadamard Transform Converter system according to one embodiment of the present invention.

FIG. 6 illustrates an Inverse Hadamard Transform Converter system (IHT converter system) 600 with continuous valid coefficient feeding. An IHT converter 601 in the embodiments as shown in FIGS. 2 and 4 is included in the IHT converter system 600. A SRAM 602 having two ports: a read port and a write port to provide input/output/temporary data storage, is employed in the IHT converter system 600. As shown in FIG. 6, the read port of the SRAM 602 is coupled to the input of the IHT converter 601 via a read channel 603 and the output of the IHT converter 601 is coupled to the SRAM 602 via a write channel 604.

The SRAM 602 contains a memory space for storing 32 entries and each entry is adaptive in order to store a coefficient. The memory space is divided in two: a lower half-memory, i.e., entry 0-entry15, and a higher half memory, i.e., entry 16-entry 31.

Figure 7A:
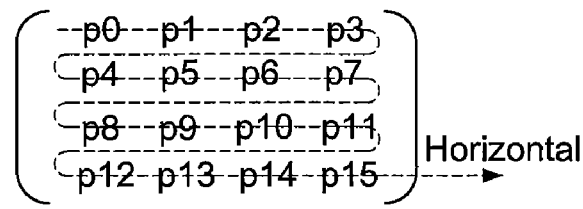
FIGS. 7a and 7b illustrate an example of two-pass IHT conversion input of Intra 16×16 DC coefficients.
Figure 7B:
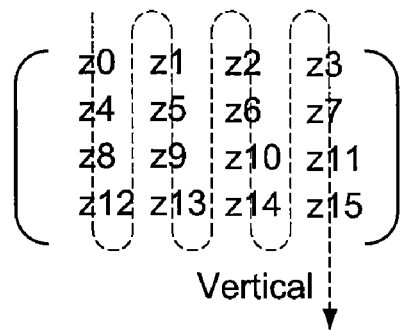

FIGS. 7a and 7b illustrate an example of two-pass IHT conversion input of Intra 16×16 DC coefficients. In FIG. 7a, the initial coefficients p0, p2, p1, p3 . . . p15 are inputted into the IHT converter horizontally. In FIG. 7b, the results after pass 1, i.e., z0, z1, z2, z3 . . . z14, need to be inputted into the IHT converter vertically.

FIG. 8 illustrates the storage states of the SRAM of the IHT conversion system according to one embodiment of the present invention. Also referring to FIGS. 6, 7a, 7b and 8, the initial coefficients p0, p2, p1, p3 . . . p15 are inputted to the SRAM and occupy the lower half memory. Usually, the lower half memory is filled by design at earlier stage of the decompression pipeline.

In pass 1, i.e. the horizontal feeding stage, a read address, rd_addr, is provided to the SRAM, and then the coefficients p0, p2, p1, p3 . . . p15 in the lower half memory, rd_data, are read to the input of the IHT converter via the read channel 603. Since the read 603 channel is incremental addressing, the coefficients p0, p2, p1, p3 . . . p15 are transferred via the read channel to the LIHT converter sequentially. After pass 1, outputted coefficient z0, z3, z1, z2 . . . z14 are generated.

Since the outputted coefficient z0, z3, z1, z2 . . . z14 of the horizontal feeding stage will serve as the inputs of pass 2, i.e. the vertical feeding stage, the write channel 604 does address remapping to the outputted coefficient z0, z3, z1, z2 . . . z14. According to the remapped address, the outputted coefficient z0, z3, z1, z2 . . . z14 are written into the higher half of the SRAM 602 in the order z0, z8, z4, z12 . . . z15. As a result, a new order as required by the input of the vertical feeding stage is stored in the higher half of SRAM 602.

Then, at pass 2, i.e. the vertical feeding stage, the coefficient z0, z8, z4, z12 . . . z15 are read from the higher half of SRAM to the IHT converter via the read channel. After the IHT process, the final results u0, u12, u4, u8 . . . u11 are produced. Again, via the address-remapping write channel, the final coefficients u0, u1, u4, u5 . . . u15 are stored in the lower half memory as shown in FIG. 8.

The converter operation details for Intra 16×16 DC mode are as follows:

Pass 1:

Converter circuit input sequence:

p0 p2 p1 p3 p4 p6 p5 p7 p8 p10 p9 p11 p12 p14 p13 p15

Converter circuit output sequence:

z0 z3 z1 z2 z4 z7 z5 z6 z8 z11 z9 z10 z12 z15 z13 z14

Addrmapping1: Change coefficient order to match what pass 2 expects:

z0 z8 z4 z12 z1 z9 z5 z13 z2 z10 z6 z14 z3 z11 z7 z15

Pass 2:

Converter circuit expected input sequence:

z0 z8 z4 z12 z1 z9 z5 z13 z2 z10 z6 z14 z3 z11 z7 z15

Converter circuit output sequence:

u0 u12 u4 u8 u1 u13 u5 u9 u2 u14 u6 u10 u3 u15 u7 u11

Addrmapping2: Change coefficient order:

u0 u1 u4 u5 u2 u13 u6 u7 u8 u9 u12 u13 u10 u11 u14 u15

Figure 9A:
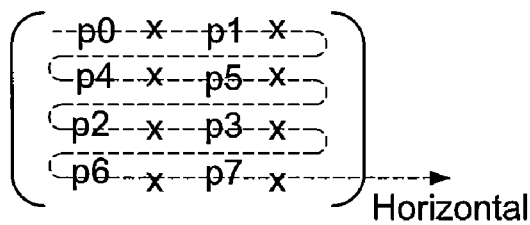
FIGS. 9a and 9b illustrate an example of two-pass IHT conversion input of Chroma DC coefficients.
Figure 9B:
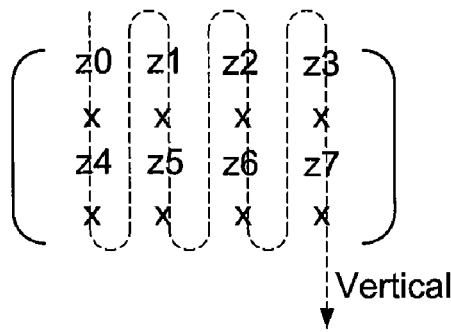

FIGS. 9a and 9b illustrate an example of two-pass IHT conversion input of Chroma DC coefficients. In FIG. 9a, the initial coefficients p0, p2, p1, p3 . . . p7 are inputted into the IHT converter horizontally. In FIG. 7b, the results after pass 1, i.e., z0, z1, z2, z3 . . . z7 need to be inputted into the IHT converter vertically.

FIG. 10 illustrates the storage states of the SRAM of the IHT conversion system according to one embodiment of the present invention. The converter operations for Chroma DC mode are similar as those for Intra 16×16 DC mode, and will not be repeated here.

The converter operation details for Chroma DC mode are as follows:

Pass 1:
Converter circuit input sequence:
p0 p1 x x p4 p5 x x p2 p3 x x p6 p7 x x
Converter circuit output sequence:
z0 x x z1 z4 x x z5 z2 x x z3 z6 x x z7
addrmap1: Change coefficient order to match what pass 2 expects
z0 z4 x x z1 z5 x x z2 z6 x x z3 z7 x x
Pass 2:
Converter circuit expected input sequence:
z0 z4 x x z1 z5 x x z2 z6 x x z3 z7 x x
Converter circuit output sequence:
u0 x x u4 u1 x x u5 u2 x x u6 u3 x x u7
Addrmapping2: Change coefficient order:
u0 u1 u4 u5 u2 u13 u6 u7 x x x x x x x x The coefficients in the light grey area in FIG. 8 and FIG. 10 are valid data and those in the dark grey area are invalid. From FIG. 8, it can be seen that the coefficients inputted in the IHT converter are continuously the valid coefficients without an idle cycle.

Figure 11:
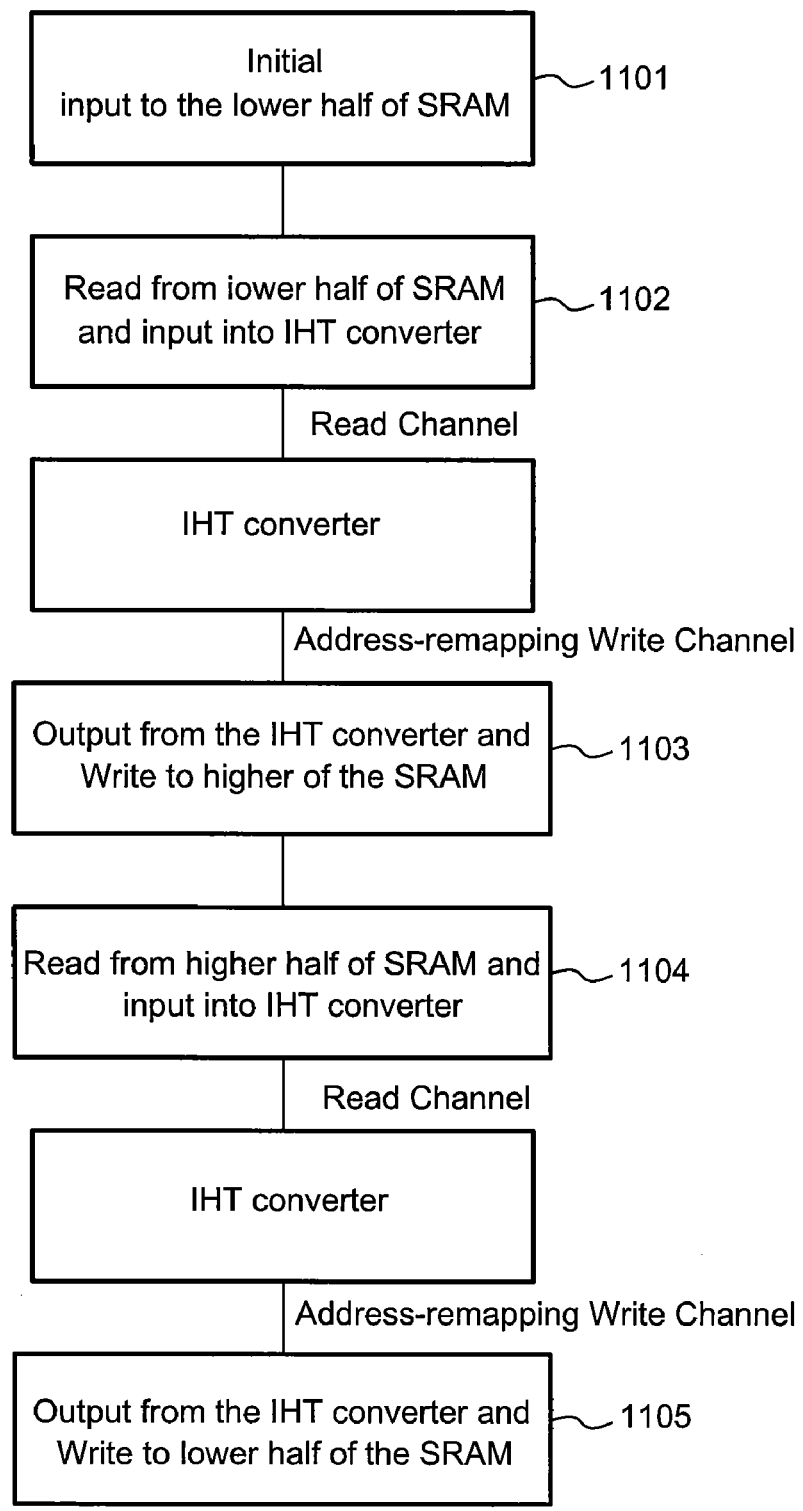
FIG. 11 illustrates a flow chart of a method for Inverse Hadamard Transform (IHT) according to one embodiment of the present invention.

FIG. 11 illustrates a flow chart of a method for Inverse Hadamard Transform. As shown in FIG. 11, in pass 1, at Step 1101, the coefficients to be converted are initially inputted into a lower half of a SRAM; at Step 1102, the coefficients are sequentially read from the lower half of SRAM and inputted into an IHT converter in the embodiments shown in FIGS. 2 and 4; and at Step 1103, the coefficients outputted from the IHT converter are written to a higher half of the SRAM via an address-remapping write channel so that the order of the coefficients stored in the higher half of the SRAM is required in pass 2. In pass 2, at Step 1104, the coefficients outputted from the IHT converter in pass 1 are read from the higher half of SRAM and inputted into the IHT converter sequentially; and at Step 1105, the coefficients outputted from the IHT converter in pass 2 are written to a lower half of the SRAM via an address-remapping write channel.

The present invention optimizes the resource usage with the pipeline structure without an idle cycle. The area, and therefore cost, is minimized, but the performance is fast enough to support HD decompression. Also, the hardware for inverse Hadamard Transform is suitable for both intra 16×16 DC coefficients and Chroma DC coefficients after a padding invalid variable is added. The cost may be further reduced. In addition, a write-address remapping mechanism is employed to provide continuous valid input coefficients without an area penalty.

The present invention achieves a good balance between cost and performance and is highly suitable for use as video decoders in resource-limited apparatuses. The present invention also can be used in the encoding side of resource-limited apparatuses for Hadamard Transform since the Hadamard Transform is reversible.

Although the embodiments disclosed above are discussed in the scope of providing solutions in response to a need for an encoding/decoding technique for image data, one of ordinary skill in the art can easily adopt the same processor engine or method for the providing of other type of purposes. Variations, modifications, and other implementations of what is described herein will occur to those of ordinary skill in the art without departing from the spirit and scope of the present invention as claimed. Accordingly, the present invention is to be defined not by the preceding illustrative description but instead by the spirit and scope of the following claims.

The invention claimed is:

1. An Inverse Hadamard Transform (IHT) converter, comprising:
a first group of registers for receiving coefficients inputted into the IHT converter, wherein the first group of registers comprises a first register, a second register and a third register;
a first multiplexer for receiving output coefficients from the first register and third register;
a first adder for adding output coefficients from the second register and selected output coefficients from the first multiplexor and producing results;
a second group of registers for receiving the results from the first adder; and
a second adder for adding the selected results stored in the second group of registers.

2. The IHT converter according to claim 1, wherein the second group of registers comprises four registers.

3. The IHT converter according to claim 1, further comprising a second multiplexer between the second group of registers and the second adder for inputting the selected results into the second adder.

4. The IHT converter according to claim 1, further comprising a register for receiving a result from the second adder.

5. The IHT converter according to claim 1, further comprising a selection circuit between the first adder and the second group of registers for inputting the result of the first adder into a selected register in the second group of registers.

6. The IHT converter according to claim 1, wherein an output of the first adder is coupled to each register in the second group of registers, and wherein an enable signal is provided to each register in the second group of registers so that the result of the first adder is inputted into a selected register in the second group of registers.

7. The IHT converter according to claim 6, further comprising a cycle counter for providing the enable signal to each register in the second group of registers.

8. An Inverse Hadamard Transform (IHT) converter, comprising:
a first group of registers, wherein the first group of registers comprises a first register, a second register and a third register;
a first adder;
a first multiplexer for receiving output coefficients from the first register and third register and for inputting selected values stored in the first and third registers into the first adder;
a second group of registers coupled to the first adder;
a second adder; and
a second multiplexer for inputting selected the values stored in the second group of registers into the second adder.

9. The IHT converter according to claim 8, wherein an enable signal is provided to each register in the second group of registers so that a result of the first adder is inputted into a selected register in the second group of registers.

10. The IHT converter according to claim 9, further comprising a cycle counter for providing the enable signal to each register in the second group of registers.

11. The IHT converter according to claim 10, wherein the cycle counter also provides a selection signal to each of the first and second multiplexer.

12. An Inverse Hadamard Transform (IHT) converter system, comprising:
a SRAM; and
an IHT converter comprising:
a first group of registers for receiving coefficients inputted to the IHT converter, wherein the first group of registers comprises a first register, a second register and a third register;
a first multiplexer for receiving output coefficients from the first register and third register;
a first adder for adding output coefficients from the second register and selected output coefficients from the first multiplexor;
a second group of registers for receiving results from the first adder; and
a second adder for adding selected the results stored in the second group of registers;
wherein, an input of the IHT converter is coupled to the SRAM via a read channel;
and an output of the IHT converter is coupled to the SRAM via a write channel.

13. The IHT converter system according to claim 12, wherein the write channel is address-remapped so that the remapped outputs of the IHT are arranged in a suitable order so that they can be re-inputted into the IHT converter.

14. The IHT converter system according to claim 13, wherein SRAM comprises a first half and a second half; and the IHT converter is fed from the first half via the read channel and outputs to the second half via the write channel in a first pass.

15. The IHT converter system according to claim 14, wherein the IHT converter is fed from the second half via the read channel and outputs to the first half via the write channel in a second pass.

16. The IHT converter system according to claim 12, wherein the first group of registers of the IHT converter comprises three registers and the second group of registers comprises four registers.

17. The IHT converter system according to claim 12, wherein the IHT converter further comprises a selection circuit between the first adder and the second group of registers for inputting the result of the first adder into a selected register in the second group of registers.

18. The IHT converter system according to claim 12, wherein in the IHT converter, an output of the first adder is coupled to each of the second group of registers, and wherein an enable signal is provided to each register in the second group of registers so that the result of the first adder is inputted into a selected register in the second group of registers.

19. The IHT converter system according to claim 18, wherein the IHT converter further comprises a cycle counter for providing the enable signal to each register in the second group of registers.

20. An Inverse Hadamard Transform (IHT) converter, comprising:
a first group of registers for receiving coefficients inputted into the IHT converter;
a first adder for adding selected coefficients stored in the first group of registers and producing results;
a second group of registers for receiving the results from the first adder;
a second adder for adding the selected results stored in the second group of registers; and
a selection circuit between the first adder and the second group of registers for inputting the result of the first adder into a selected register in the second group of registers.

21. An Inverse Hadamard Transform (IHT) converter, comprising:
a first group of registers for receiving coefficients inputted into the IHT converter;
a first adder for adding selected coefficients stored in the first group of registers and producing results;
a second group of registers for receiving the results from the first adder;
a second adder for adding the selected results stored in the second group of registers;
wherein an output of the first adder is coupled to each register in the second group of registers, and wherein an enable signal is provided to each register in the second group of registers so that the result of the first adder is inputted into a selected register in the second group of registers.

22. The IHT converter according to claim 21, further comprising a cycle counter for providing the enable signal to each register in the second group of registers.

23. An Inverse Hadamard Transform (IHT) converter system, comprising:
a SRAM; and
an IHT converter comprising:
a first group of registers for receiving coefficients inputted to the IHT converter;
a first adder for adding selected the coefficients stored in the first group of registers;
a second group of registers for receiving results from the first adder; and
a second adder for adding selected the results stored in the second group of registers; and
a selection circuit between the first adder and the second group of registers for inputting the result of the first adder into a selected register in the second group of registers
wherein, an input of the IHT converter is coupled to the SRAM via a read channel;
and an output of the IHT converter is coupled to the SRAM via a write channel.

24. An Inverse Hadamard Transform (IHT) converter system, comprising:
a SRAM; and
an IHT converter comprising:
a first group of registers for receiving coefficients inputted to the IHT converter;
a first adder for adding selected the coefficients stored in the first group of registers;
a second group of registers for receiving results from the first adder; and
a second adder for adding selected the results stored in the second group of registers;
wherein in the IHT converter, an output of the first adder is coupled to each of the second group of registers, and wherein an enable signal is provided to each register in the second group of registers so that the result of the first adder is inputted into a selected register in the second group of registers; and wherein, an input of the IHT converter is coupled to the SRAM via a read channel; and an output of the IHT converter is coupled to the SRAM via a write channel.

25. The IHT converter system according to claim 24, wherein the IHT converter further comprises a cycle counter for providing the enable signal to each register in the second group of registers.

* * * * *